United States Patent
Jeong

(10) Patent No.: US 6,228,211 B1
(45) Date of Patent: *May 8, 2001

(54) APPARATUS FOR ETCHING A GLASS SUBSTRATE

(75) Inventor: Jae Gyu Jeong, Daeku-shi (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,959

(22) Filed: Sep. 3, 1999

(30) Foreign Application Priority Data

Sep. 8, 1998 (KR) .................................. 98-37000

(51) Int. Cl.[7] .................................................. C23F 1/02
(52) U.S. Cl. ............................ 156/345; 118/726; 134/37
(58) Field of Search ................. 156/345; 216/57; 134/37; 118/726; 261/142; 219/121.15

(56) References Cited

U.S. PATENT DOCUMENTS

| | | |
|---|---|---|
| 3,689,333 | 9/1972 | Hillhouse . |
| 3,756,898 | 9/1973 | Frantzen et al. . |
| 3,869,313 | 3/1975 | Jones et al. . |
| 4,125,594 | 11/1978 | Su et al. . |
| 4,147,581 | 4/1979 | Nelson . |
| 4,240,880 | 12/1980 | Tsuchibuchi et al. . |

(List continued on next page.)

FOREIGN PATENT DOCUMENTS

| | | |
|---|---|---|
| 1 920 009 | 10/1970 | (DE) . |
| 36 11 387 | 10/1987 | (DE) . |
| 38 53 904 | 10/1995 | (DE) . |
| 0 586 147 | 3/1994 | (EP) . |
| 0 659 521 | 6/1995 | (EP) . |
| 1 200 180 | 12/1959 | (FR) . |
| 829605 | 3/1960 | (GB) . |
| 2 178 894 | 2/1987 | (GB) . |
| 2 178 895 | 2/1987 | (GB) . |
| 60-163435 | 8/1985 | (JP) . |
| 1-189631 | 7/1989 | (JP) . |
| 2-138459 | 5/1990 | (JP) . |
| 2-141703 | 5/1990 | (JP) . |
| 2-196222 | 8/1990 | (JP) . |
| 3-022390 | 1/1991 | (JP) . |
| 7-168172 | 7/1995 | (JP) . |

OTHER PUBLICATIONS

Von Bernd Hartmann, "Neue Recyclingtechniken und Abwasser—behandlungsmethoden", *Technische Rundschau*, 37/90, pp. 104–107 & 109 (No English Abstract) No Date Available.

*Primary Examiner*—Gregory Mills
*Assistant Examiner*—Sylvia R MacArthur
(74) *Attorney, Agent, or Firm*—Long, Aldridge & Norman

(57) ABSTRACT

An apparatus for etching a glass substrate is disclosed which comprises a container 1; a porous plate 4 being set in the container 1 and having a plurality of holes 30; and a bubbling plate 3 being under the porous plate 4 and providing bubbles to the porous plate 4. The glass substrate 11 is uniformly etched because the liquid etchant is provided uniformly to the surface of the glass substrate 11 through the holes 30 of the porous plate 4. Further, the impurities on the surface of the glass substrate 11 is easily removed by the bubbles generated by the bubbling plate 3.

14 Claims, 6 Drawing Sheets

U.S. PATENT DOCUMENTS

| | | |
|---|---|---|
| 4,332,649 | 6/1982 | Sälzle . |
| 4,341,841 | 7/1982 | Ohno et al. . |
| 4,482,425 * | 11/1984 | Battey ................................. 156/637 |
| 4,501,636 | 2/1985 | Valley . |
| 4,624,729 | 11/1986 | Bresciani et al. . |
| 4,715,686 | 12/1987 | Iwashita et al. ................. 350/339 R |
| 4,826,556 * | 5/1989 | Kobayashi ........................... 156/345 |
| 4,846,868 | 7/1989 | Aratani . |
| 4,886,590 | 12/1989 | Tittle . |
| 4,953,952 | 9/1990 | Okumura et al. .................... 350/337 |
| 4,980,017 | 12/1990 | Kaji et al. ............................ 156/642 |
| 5,000,795 * | 3/1991 | Chung et al. .......................... 134/37 |
| 5,002,627 | 3/1991 | Scheithauer et al. . |
| 5,082,518 * | 1/1992 | Molinaro ............................... 156/345 |
| 5,112,437 | 5/1992 | Watanabe et al. . |
| 5,112,453 | 5/1992 | Behr et al. ........................ 204/129.2 |
| 5,159,787 | 11/1992 | Suenaga et al. . |
| 5,164,018 | 11/1992 | Barcelona, Jr. . |
| 5,246,540 | 9/1993 | Soda . |
| 5,251,980 | 10/1993 | Hiraoka et al. .......................... 374/7 |
| 5,277,715 | 1/1994 | Cathey .................................... 134/2 |
| 5,378,308 | 1/1995 | Thoms . |
| 5,389,148 | 2/1995 | Matsunaga . |
| 5,429,711 | 7/1995 | Watanabe et al. . |
| 5,434,433 | 7/1995 | Takasu et al. . |
| 5,505,804 | 4/1996 | Mizuguchi et al. . |
| 5,540,784 * | 7/1996 | Ranes .................................... 134/10 |
| 5,543,181 | 8/1996 | Fehn et al. . |
| 5,654,057 | 8/1997 | Kitayama et al. .................. 428/64.1 |
| 5,766,493 | 6/1998 | Shin . |
| 5,788,871 | 8/1998 | Huh ....................................... 216/84 |
| 5,808,715 | 9/1998 | Tsai et al. . |
| 5,818,559 | 10/1998 | Yoshida ................................ 349/122 |
| 5,819,434 * | 10/1998 | Herchen et al. ..................... 156/345 |
| 6,017,374 * | 1/2000 | Huxham .............................. 55/315.2 |

* cited by examiner

APPARATUS FOR ETCHING A GLASS SUBSTRATE

This application claims the benefit of Korean Application No. 1998-37000 filed on Sep. 8, 1998 which is hereby incorporated by reference.

BACKGROUND OF THE INVENTION

1. Field of the Invention

The present invention relates to an apparatus for etching a glass substrate, and more particularly to an apparatus for etching uniformly a glass substrate.

2. Discussion of the Related Art

Lots of researches have been made for flat panel display devices such as LCD(Liquid Crystal Display), PDP(Plasma Display Panel), ELD(Electroluminescent Display), and VFD(Vacuum Fluorescent Display). In these flat panel display devices, the LCD has been most actively researched recently because of good picture quality and low consumption in spite of various disadvantage.

Although portable televisions and notebook computers with the LCD have been marketed, there are various problems yet to be solved. Because televisions and computers have become portable electronics, the reduction of the size and weight is one of the goals in the LCD research.

There are various methods to reduce the size and weight of the LCD. It is, however, difficult to reduce the number of the essential elements of the LCD. In addition, the weight and size of the essential elements are so small that the weight and size of the essential elements hardly can be reduced further.

Fortunately, a glass substrate, which is one of the most basic element of the LCD, may be reduced in weight. Specially, the weight reduction of the glass substrate is very important because it makes up a large portion of the total weight of the LCD.

To reduce the weight of the glass substrate, the substrate has to be thinner. The glass thinning process is, however, very difficult technically because the processed thin glass can be easily damaged and the surface becomes rough after the process.

Conventionally, the most useful method of reducing the weight of the glass substrate is to etch the surface of the glass substrate by soaking the substrate in a container having an etchant. In this method, however, the substrate is often not etched uniformly. Further, the impurities generated during the etching process are attached to the surface of the substrate, so that the surface becomes even rougher.

To solve the aforementioned problems, a glass thinning method is introduced wherein the substrate is set up in the container having the etchant and then bubbles are generated to the surface of the substrate through a porous plate to remove the impurities attached on the surface of the substrate and a fresh etchant is applied to the surface of the substrate. In this method, however, since the bubbles having different sizes are applied on the upper portion and lower portion of the substrate, there is a thickness difference between the upper portion and lower portion. As a result, the substrate is still easily damaged even by light force during the LCD process because of the non-uniformity of the substrate. Further, the substrate has to be soaked for a long period, for example, scores of minutes, to etch the substrate sufficiently. Thus, the processing cost is increased in this method.

SUMMARY OF THE INVENTION

Accordingly, the present invention is directed to an apparatus for etching glass substrate that substantially obviates one or more of the problems due to limitations and disadvantages of the related art.

An object of the present invention is to provide an apparatus for etching glass substrate having a thin thickness and uniform surface.

In order to achieve the object, the present invention provides an apparatus for etching a glass substrate comprising a container; a porous plate set in the container and having a plurality of holes; and a bubbling plate under the porous plate and providing bubbles to the porous plate.

The glass substrate is uniformly etched because the liquid etchant is provided uniformly to the surface of the glass substrate through the holes of the porous plate. Further, the impurities on the surface of the glass substrate is easily removed by the bubbles generated by the bubbling plate.

BRIEF DESCRIPTION OF THE DRAWINGS

The accompanying drawings, which are included to provide a further understanding of the invention and are incorporated in and constitute a part of this application, illustrate embodiments of the inventing and together with the description serve to explain the principle of the invention.

DETAILED DESCRIPTION OF THE PREFERRED EMBODIMENTS

Figure 1:
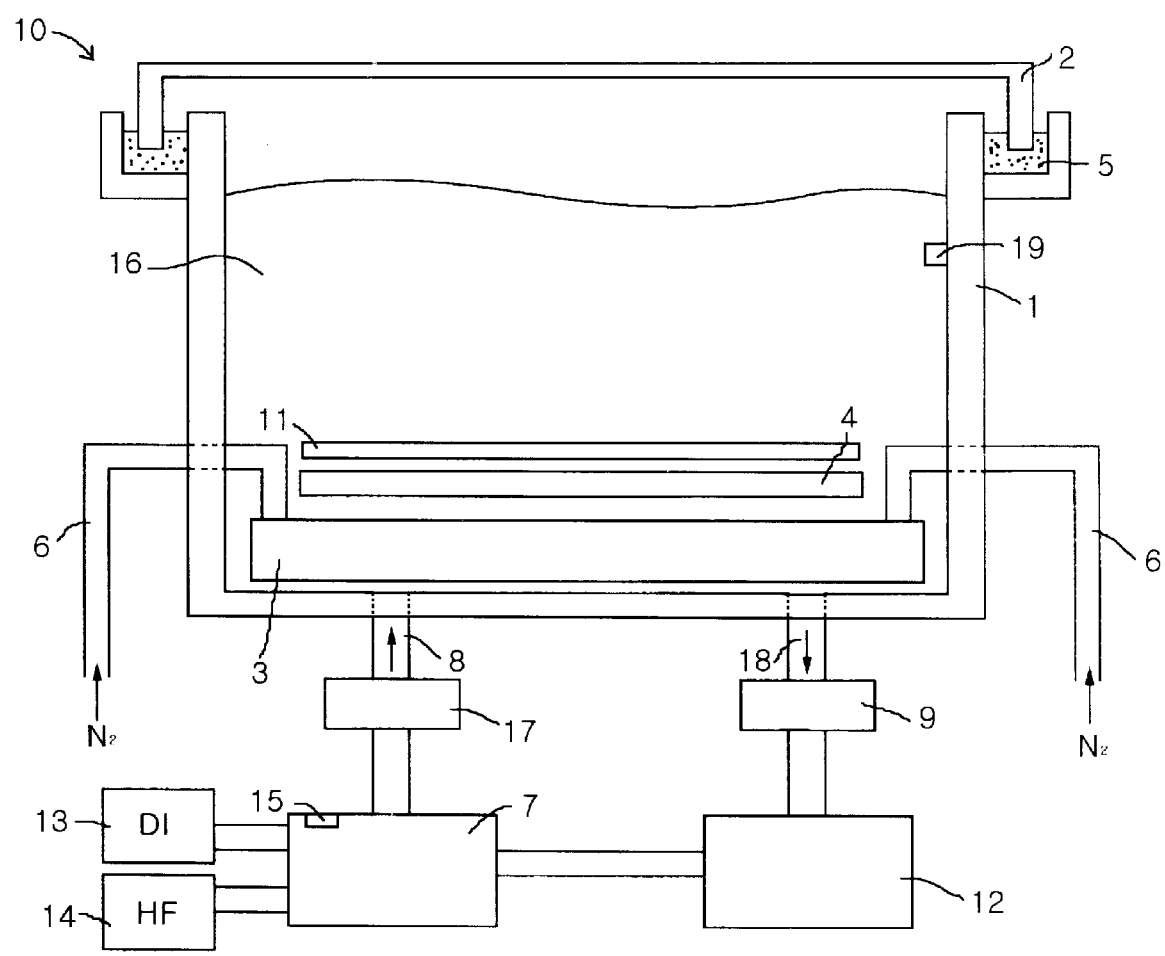
FIG. 1 is a view showing an apparatus for etching a glass substrate of a first embodiment according to the present invention.

Referring to the drawings, various embodiments of the present invention are described in detail as follows.

As shown in FIG. 1, an apparatus for etching a glass substrate of a first embodiment comprises a container 1; a cover 2 on an upper opened portion of the container 1; a bubbling plate 3 in the container 1; and a porous plate 4 above the bubbling plate 4. The container 1 and the cover 2 are sealed with a liquid sealant 5. The left and right end portions of the bubbling plate 3 are connected to an air supplying pipe 6 through which $N_2$ or $O_2$ of a gas tank not shown is supplied into the bubbling plate 4.

A bottom of the container 1 is connected to a liquid etchant supplying pipe 8 through which the liquid etchant is supplied into the container 1 from the compound mixing tank 7.

Having been used to etch a glass substrate 11 above the porous plate 4, the liquid etchant is discharged into a filter 9 through a liquid etchant discharging pipe 18. Impurities in the used liquid etchant are removed by the filter 9, and then stored in a buffer tank 12. The filtered liquid etchant in the buffer tank 12 is provided to the compound mixing tank 7, and then mixed with distilled water(DI) and HF which are supplied from DI and HF supplying portions 13 and 14, respectively. The concentration of the mixture in the mixing tank 7 is measured by a concentration measuring device 15 set in the mixing tank 7, and when the measured concentration reaches at a predetermined reference concentration, the DI and HF supplies stop. The reference concentration is preferred to be in a range of 1 to 50%. A cooling water (PCW) pipe not shown is set in the mixing tank 7 to impart a uniform temperature to the mixture in the mixing tank 7. The mixed liquid etchant in the mixing tank 7 is provided into the container 1 by a pump 17.

A temperature sensor 19 is set in the container 1 to detect the temperature change caused by an exothermic reaction of the glass substrate 11 and the liquid etchant. The glass substrate 11 is etched through the temperature change.

A glass substrate 1.4 mm thick on the market can be thinned to 0.5 mm thick by this etching apparatus. The temperature setting is determined by the following formula, and the etching process automatically stops when it reaches at the final temperature.

Figure 2A:
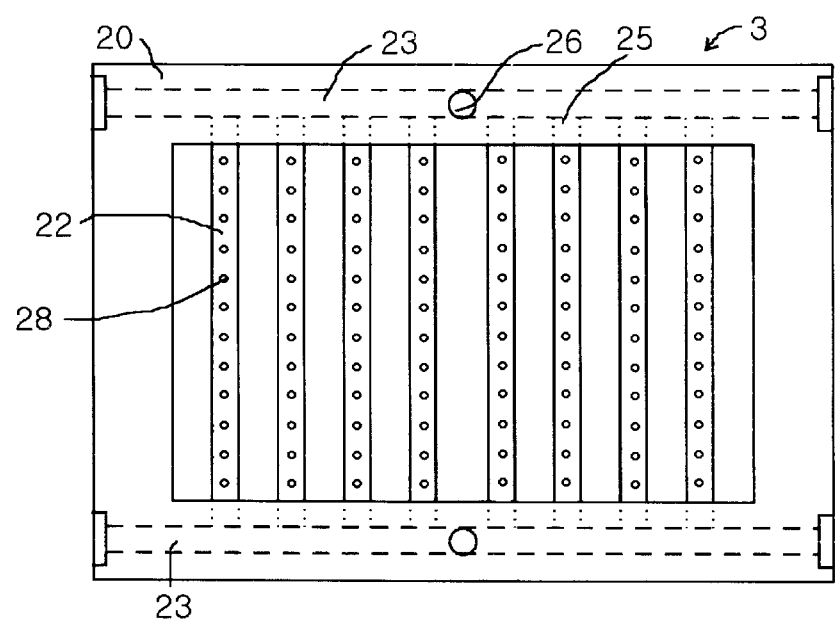
FIG. 2a is a plane view showing a bubbling plate 3 of the first embodiment.
Figure 2B:
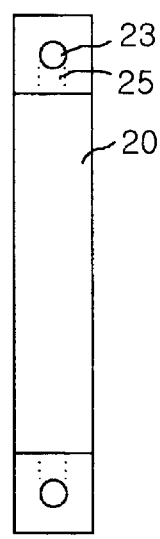
FIGS. 2b and 2c are side views showing an annular frame 20 of the first embodiment.
Figure 2C:
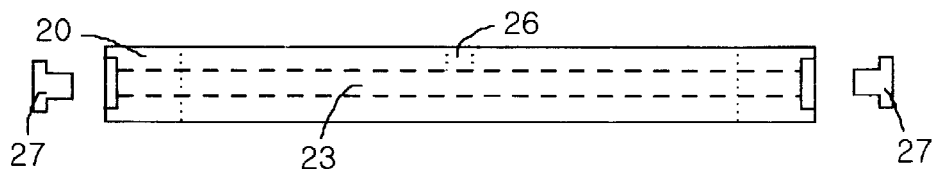
Figure 2D:
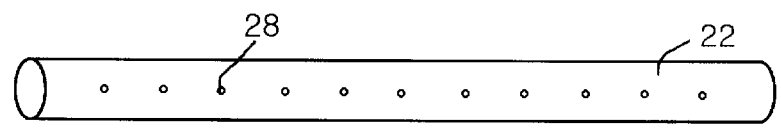
FIG. 2d is a view showing an air tube of the second embodiment.

$T_f = T_i + (K_r \cdot N \cdot \Delta t_2)/m$ $T_f$: final temperature, $T_i$: initial termperature, $K_r$: reactive constant, N: number of the substrate $\Delta t_2$: desired thickness FIG. 2a is a plane view showing the bubbling plate 3, FIG. 2b is a left side view of FIG. 2a, FIG. 2c is a front and rear view of FIG. 2a, and FIG. 2d is a view showing an air tube 22. As shown in these figures, the bubbling plate 3 comprises an annular frame 20 in square form, and a plurality of air tubes 22 which are arranged parallel to the left and right side portions of the annular frame 20 to be connected to the inner surface of the annular frame 20, and which have a plurality of holes 28 in their upper surfaces. The annular frame 20 has two air passages 23 therein and arranged parallel to the front and back portions. The two air passages 23 are each connected to both ends of the air tubes 22 through air discharging holes 25 in the annular frame 20, and each connected to two air supplying tubes 6 illustrated in FIG. 1 through air filling holes 26. As shown in FIG. 2c, each plug 27 is inserted into both the opening ends of the air passages 23.

Figure 2E:
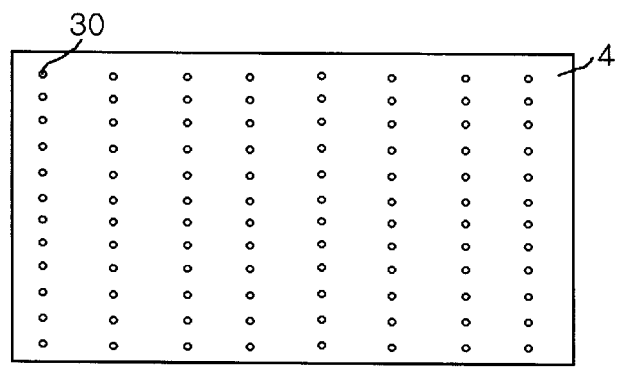
FIG. 2e is a plane view showing a porous plate of the first embodiment.

FIG. 2e is a plane view showing a porous plate 4 set above the bubbling plate 3. The porous plate 4 has a plurality of holes 30 in arrangement corresponding to the holes 28 of the air tube 22.

The process of etching a glass substrate in the present invention is as follows.

As shown in FIG. 1, the pump 17 operates after the glass substrate 11 is set above the porous plate 4 to pump the filtered liquid etchant in the mixing tank 7 into the container 1. Then, the filtered liquid etchant is uniformly provided to the surface of the glass substrate 11 through the bubbling plate 3 and the holes of the porous plate 4.

$N_2$ gas filled into the bubbling plate 3 through the air supplying plate 6 enters the air tubes 22 after passing through the air filling holes 26, the air passages 23, and the air discharging holes 25 in the named order, and then they are changed into bubbles after passing through the holes 28 of the air tubes 22.

Thereafter, the bubbles pass through holes 30 of the porous plate 4, and are provided to the surface of the glass substrate 11 to remove the impurities thereon. Because the bubbles pass through the holes 30 of the porous plate 4, the holes 30 are prevented from being stopped with the impurities.

There are impurities in the liquid etchant used to etch the glass substrate 11. The used liquid etchant flows into the filter 9 through the liquid etchant discharging pipe 18, and then it is filtered by the filter 9. The filtered liquid etchant is stored in the buffer tank 12, and then provided to the compound mixing tank 7 to be mixed with DI and HF each from the DI and HF supplying portions 13 and 14. Being pressured by the pump 17, the mixed liquid etchant is provided into the container 1 through the liquid etchant supplying pipe 8.

Figure 3:
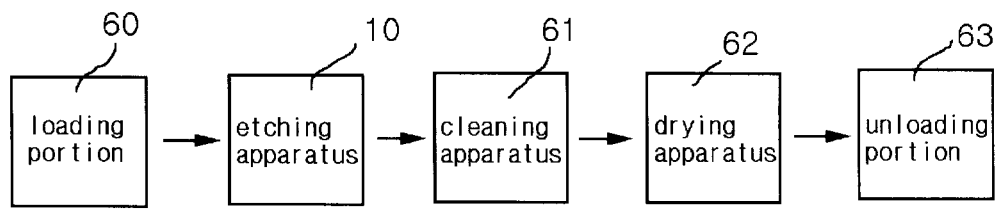
FIG. 3 is a block view showing the whole constitute of the etching process of the glass substrate.

FIG. 3 is a block view showing the whole constitution of the etching process which comprises a loading portion 60, the etching apparatus 10, a cleaning apparatus 61, a drying apparatus 62, and an unloading portion 63.

The loading portion 60 provides the glass substrate to the etching apparatus 10, and the etching apparatus 10 etches the glass substrate as mentioned above.

Figure 4:
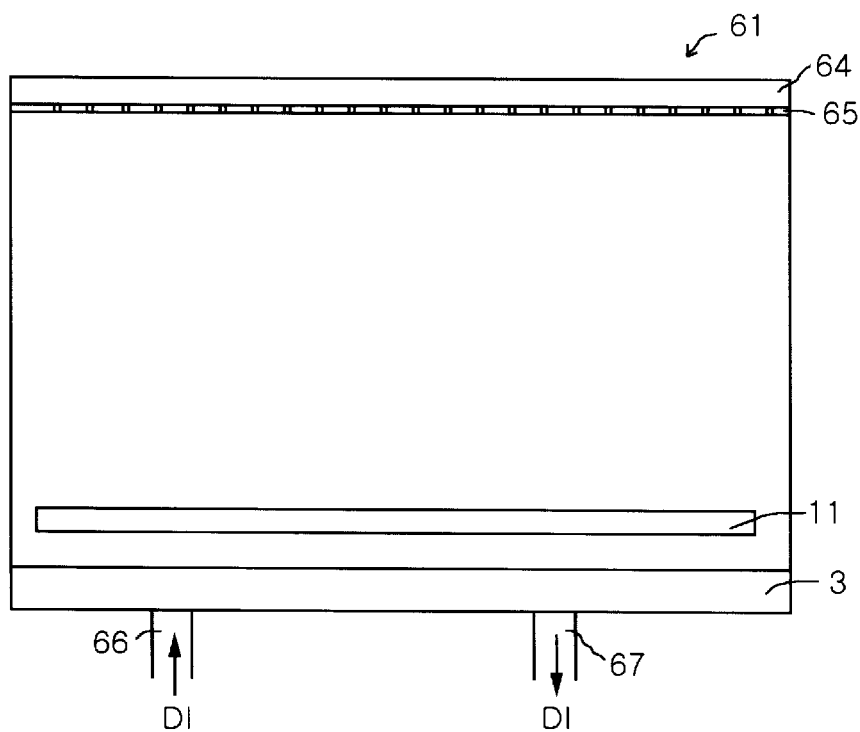
FIG. 4 is a vertical sectional view showing the cleaning apparatus 61 illustrated in FIG. 3.

The etched glass substrate 11 is provided to the cleaning apparatus 61, which removes the impurities on the surfaces of the glass substrate 11. As shown in FIG. 4, an upper part of the cleaning apparatus 61 has a DI and $N_2$ supplying pipe 64 and a shower nozzle 65. There are a bubbling plate 3 as mentioned above, a DI supplying pipe 66, and a DI discharging pipe 66 in a lower part of the cleaning apparatus 61.

The cleaned glass substrate is dried by the drying apparatus 62, and provided to the unloading portion 63. Air flows into the drying apparatus 62, and the glass substrate is dried with the air being exhausted.

Figure 5A:
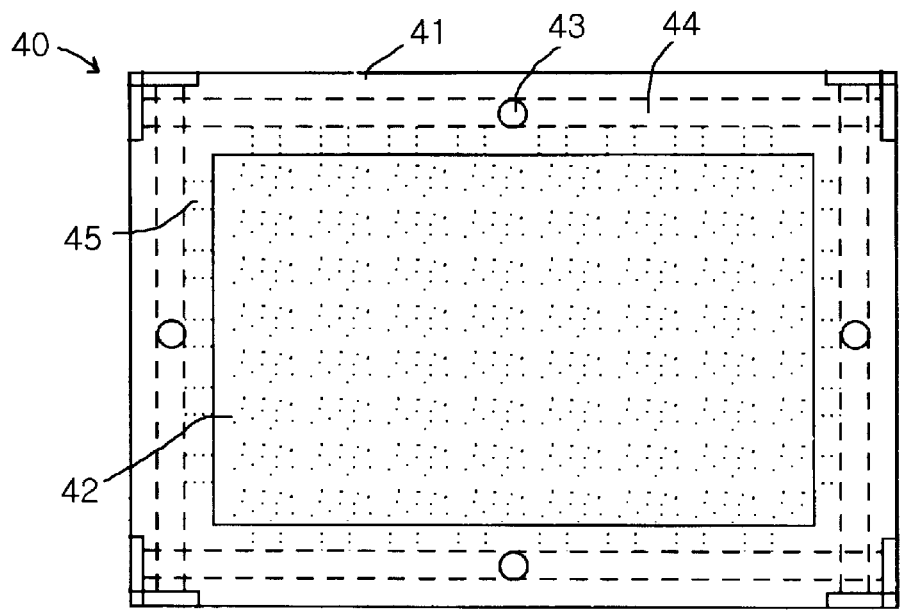
FIG. 5a a plane view showing a bubbling plate 40 of a second embodiment according to the present invention.
Figure 5B:
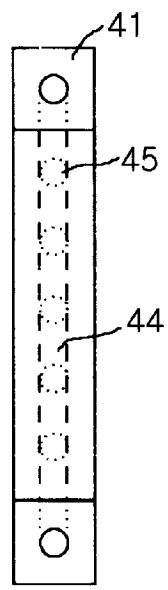
FIGS. 5b and 5c are side views showing an annular frame 41 of the second embodiment.
Figure 5C:
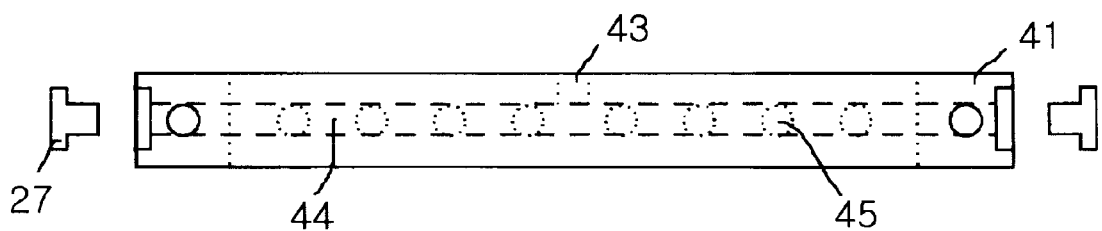
Figure 5D:
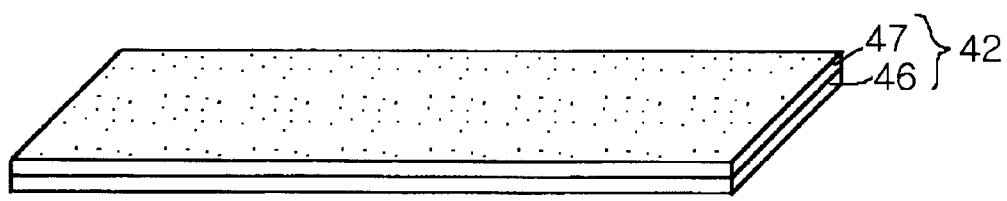
FIG. 5d is a perspective view showing a bubbling porous resin plate 42 of the second embodiment.

FIGS. 5a to 5c are views showing a bubbling plate of a second embodiment according to the present invention, where FIG. 5a is a plane view showing the bubbling plate 3, FIG. 5b is a left and right side view of FIG. 5a, and FIG. 5c is a front-rear side view of FIG. 5a. In this embodiment, the same elements as the first embodiment are indicated by the same reference numerals without description of their structures and operations. As shown the figures, the bubbling plate 40 comprises an annular frame 41 in square form, and a bubbling porous resin plate 42 surrounded by the annular frame 41. The annular frame 41 has four air filling holes in each of front, back, right, and left portions, and one annular-shaped air passage 44 in the four portions of annular frame 41. The annular frame 41 has a plurality of air discharging holes uniformly aligned in its inner surface. The bubbling porous resin plate 42 comprises a bubbling teflon resin layer 47, and a teflon resin layer 46 thereunder.

After being filled into the air filling holes 43, $N_2$ gas is provided to the bubbling porous resin plate 42 through the air passage 44 and the air discharging holes 45. Thereafter, it is changed into bubbles by the bubbling porous resin plate 42, and then provided to the surface of the glass substrate 11 through the holes of the porous plate 4 to remove the impurities thereon. Because the bubbles pass through the holes 30 of the porous plate 4, the holes 30 is prevented from being stopped with the impurities.

After provided into the container 1 through the liquid etchant supplying pipe 8, the liquid etchant is uniformly provided to the surface of the glass substrate 11 passing through the bubbling porous resin plate 42 and the holes 30 of the porous plate 4.

The present invention has the following advantages. The glass substrate is uniformly etched because the liquid etchant is provided uniformly to the surface of the glass substrate 11 through the holes of the porous plate 4. Further, the impurities on the surface of the glass substrate 11 are easily removed by the bubbles generated by the bubbling plate.

It will be apparent to those skilled in the art that various modifications and variations can be made in an apparatus for etching a glass substrate of the present invention without departing from the spirit or scope of the inventions. Thus, it is intended that the present invention cover the modifications and variations of this invention provided they come within the scope of the appended claims and their equivalents.

What is claimed is:

1. An apparatus for etching a glass substrate comprising:
   a container;
   a porous plate in the container and having a plurality of holes; and
   a bubbling plate under the porous plate and providing bubbles to the porous plate.

2. The apparatus according to claim 1, further comprising an etchant supplying pipe and an etchant discharging pipe, each in the container.

3. The apparatus according to claim 2, further comprising a buffer tank being connected to the etchant discharging pipe to store etchant discharged from the container.

4. The apparatus according to claim 3, further comprising a pump being connected to the buffer tank and the etchant discharging pipe to pump the etchant in the buffer tank into the container through the etchant supplying pipe.

5. The apparatus according to claim 3, further comprising a compound mixing tank being connected to the buffer tank to mix etchant from the buffer tank with a fresh etchant.

6. The apparatus according to claim 5, further comprising a pump being connected to the compound mixing tank and the etchant supplying pipe to pump the etchant in the compound mixing tank into the container through the etchant supplying pipe.

7. The apparatus according to claim 2, further comprising a filter being connected to the etchant discharging pipe to filter the etchant discharged out of the container through the etchant discharging pipe.

8. The apparatus according to claim 1, wherein the bubbling plate comprises a plurality of air tubes including a plurality of holes in surfaces thereof.

9. The apparatus according to claim 8, wherein the bubbling plate further comprises an annular frame which has:
   at least one air filling hole;
   an air passage in the annular frame connected to the at least one air filling hole; and
   at least one air discharging hole which is connected to the air passage and through which air is provided into the air tubes.

10. The apparatus according to claim 9, wherein the annular frame has a square annular shape.

11. The apparatus according to claim 1, wherein the bubbling plate comprises a bubbling porous resin plate.

12. The apparatus according to claim 11, wherein the bubbling plate further comprises an annular frame having:
   at least one air filling hole;
   an air passage in the annular frame connected to the at least one air filling hole; and
   at least one air discharging hole which is connected to the air passage and through which air is provided into the air tubes.

13. The apparatus according to claim 11, wherein the bubbling porous resin plate comprises a teflon resin layer and a bubbling teflon resin plate thereon.

14. The apparatus of claim 1. wherein the glass substrate is disposed within the container above the porous plate and receives the bubbles from the porous plate.

* * * * *